United States Patent [19]
Bell et al.

[11] 4,215,916
[45] Aug. 5, 1980

[54] SUBMERGED METER READING DEVICE

[76] Inventors: Billy W. Bell, 708 E. Summer St.;
Walter D. Ferguson, 405 N. First St.,
both of Union City, Tenn. 38261

[21] Appl. No.: 43,652

[22] Filed: May 30, 1979

[51] Int. Cl.² .................................................. G02B 23/22
[52] U.S. Cl. .................................. 350/319; 350/114;
350/63; 134/198; 134/168 R
[58] Field of Search ............... 350/319, 110, 113, 114,
350/115, 63, 78; 134/168 R, 198, 172

[56] References Cited
U.S. PATENT DOCUMENTS

| | | | |
|---|---|---|---|
| 572,803 | 12/1896 | Hubbard | 350/319 |
| 1,161,882 | 11/1915 | Pettengill | 350/319 |
| 1,236,265 | 8/1917 | Casson | 350/319 |
| 1,515,065 | 11/1924 | Milliken | 350/319 |
| 2,795,165 | 6/1957 | Vernier | 350/319 |
| 3,310,356 | 3/1967 | Borberg | 350/63 |
| 3,499,698 | 3/1970 | Malys | 350/114 |
| 3,612,649 | 10/1971 | Pusey | 350/114 |

*Primary Examiner*—Jon W. Henry
*Attorney, Agent, or Firm*—B. P. Fishburne, Jr.

[57] ABSTRACT

For convenience, speed and economy in the reading of submerged water meters, as illuminated reading scope is provided which is extendable to draw in water. The scope is compressed after being placed over the face of the meter to expel the water from its interior in a jet stream which positively flushes the face of the meter so as to render it readily readable. The scope is simple and economical.

5 Claims, 5 Drawing Figures

U.S. Patent   Aug. 5, 1980   4,215,916
FIG. 1
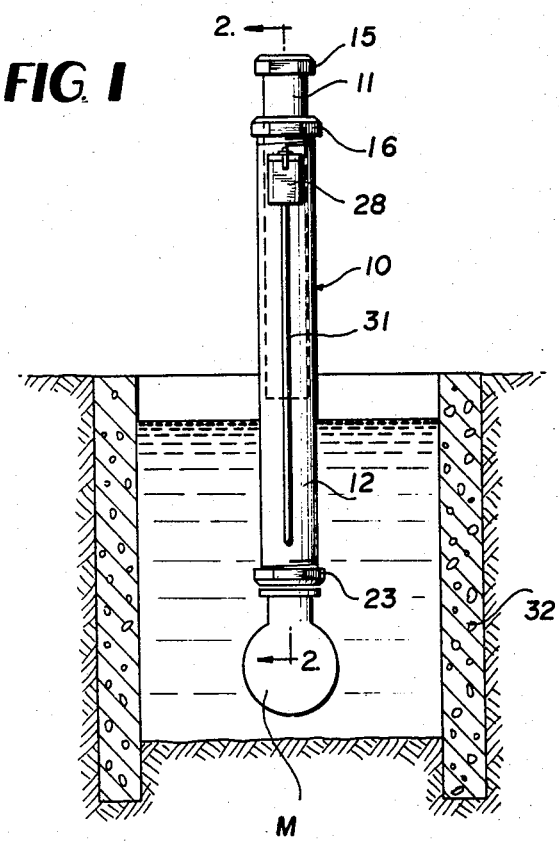
FIG. 2
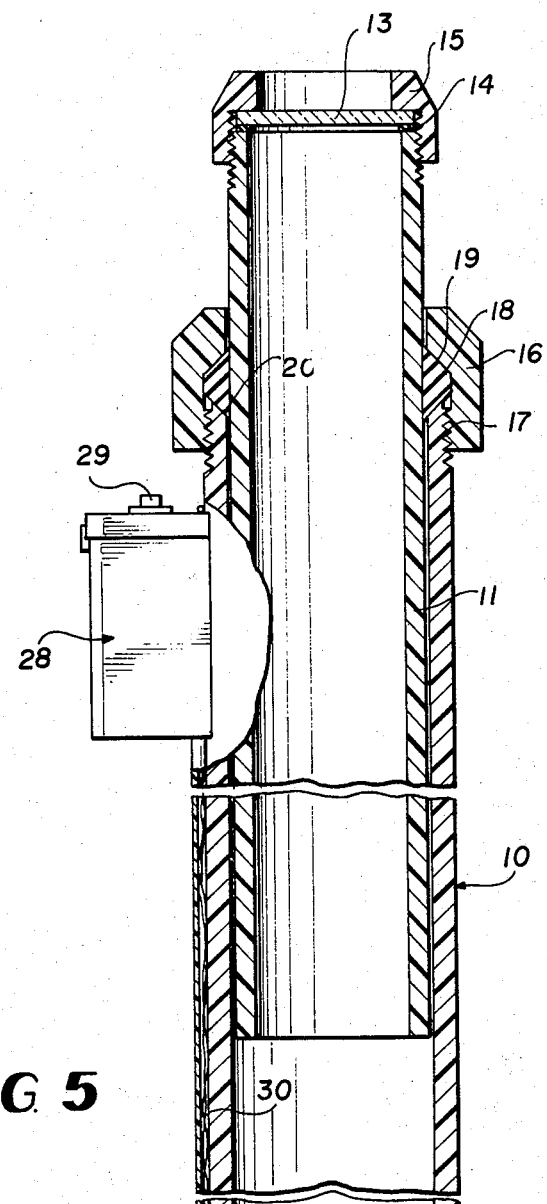
FIG. 3
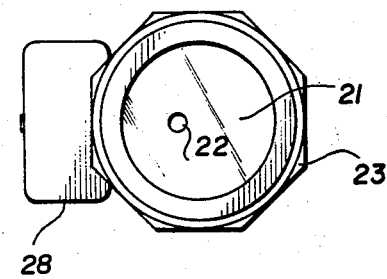
FIG. 4   FIG. 5
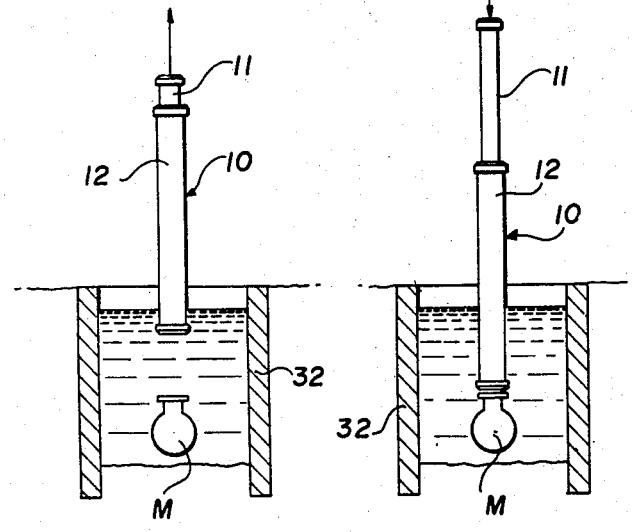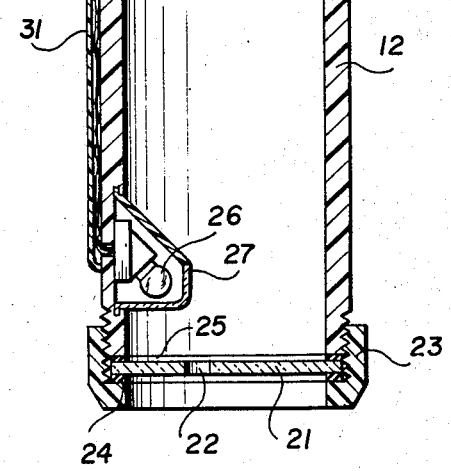

SUBMERGED METER READING DEVICE

BACKGROUND OF THE INVENTION

To prevent freezing, water meters are placed twelve to twenty-four inches below ground level in wells or boxes. In the rainy seasons or in low level regions, the meter boxes are frequently flooded. When this occurs, the meter reader is forced to bail water out of the meter box to enable him to obtain a meter reading because it is impossible to read the meter through a foot or more of water above the meter face. The customary process is awkward, time-consuming and very expensive for city water departments.

This problem has been recognized and dealt with in prior U.S. Pat. No. 1,236,265. In this patent, a downwardly flared casing having a lower open end is placed over the submerged meter face and trapped air inside of the casing resists the rising of water therein above a low level. A light bulb is provided in the casing well above its lower end and the meter face. A lens is provided at the top of the casing to facilitate reading the meter. While this device is useful, it does not effectively and completely solve the problem. Some water still rises in the bottom of the casing until air is compressed sufficiently to limit the water level therein. Also, a layer of silt frequently covers the face of the submerged meter and the device in the above patent includes no means to eliminate or wash away the silt. Hence, in many cases, the device is ineffective.

The present invention seeks to improve on the prior patented device by providing an extensible and compressible scope which has the ability to direct a flushing jet or stream of water against the face of the submerged meter to completely clear it for easy reading. Furthermore, in the present invention, the light source is arranged at the lower end of the scope inside of a waterproof capsule rather than remotely and above the water level, as in the patented device. This feature renders the device much more efficient and effective. A completely different mode of operation is utilized in the invention, whereby water from the meter box is first drawn into the scope and subsequently expelled under pressure to clean off the meter face after the lower end of the scope has been positioned close to and above the face. There is no necessity to suppress the water level in the meter box as with the prior art and the present invention does not seek to do so. The necessity for bailing out the meter box is fully eliminated and the device is very convenient to use by the meter reader and is capable of saving much time and thereby materially reducing the cost of meter reading service to the utility water department.

The full advantages of the invention will become apparent to those skilled in the art during the course of the following description.

BRIEF DESCRIPTION OF THE DRAWINGS

FIG. 1 is a side elevational view, partly in cross section, showing the meter reading device in use.

FIG. 2 is an enlarged central vertical longitudinal section through the device or scope, partly broken away.

FIG. 3 is a bottom end view of the device.

FIGS. 4 and 5 are partly schematic operational views on a reduced scale.

DETAILED DESCRIPTION

Referring to the drawings in detail wherein like numerals designate like parts, a submerged meter reading device or scope 10 comprises upper and lower tubular telescoping sections 11 and 12, preferably formed of standard PVC pipe or the like. In a practical embodiment of the invention, the collapsed length of the scope as depicted in FIG. 1 is about 27 inches and the inside diameter of the larger tube section 12 is two inches. However, the invention is in no sense limited to these dimensions which are set forth merely to show one practical size of the scope. The two scope sections 11 and 12 are open-ended.

A clear lens 13 at the top of the scope is seated on a sealing gasket 14 and retained securely by a cap 15 having threaded engagement with telescoping section 11. A compression collar 16 has threaded engagement at 17 with the top of scope section 12 and an elastic compression gasket 18 is positioned between the end of the scope section 12 and an interior inclined shoulder 19 of the compression collar. An opposing inclined end face 20 is provided on the outer scope section 12 for effective wedging of the compression gasket.

The lower end of scope section 12 is covered by another transparent lens 21 having a small aperture 22, for a purpose to be described. The lens 21 is secured by a threaded cap 23 at the bottom of the scope and is held between two sealing gaskets 24 and 25.

A small illuminating bulb and socket unit 26 is positioned fixedly close to the bottom lens 21 at one side of the scope and is enclosed in a waterproof translucent capsule 27 fixed to the wall of scope section 12. A battery pack 28 including an on-off switch 29 is suitably attached to the outside of the scope near and below the threaded compression collar 16. A two wire conductor 30 electrically interconnects the light bulb and battery pack and is protected by an external conductor sheath 31. The force required to extend and collapse the meter reading scope can be adjusted by means of the threaded collar 16 which exerts a variable compression on the rubber-like gasket 18.

As shown in FIGS. 1, 4 and 5, a water meter M to be read is mounted near the bottom of an underground box or well 32. Customarily, the face of the meter will be 12"-24" below ground level to avoid freezing. In wet weather, the box 32 will be substantially flooded above the level of the meter face, as shown in the drawings. Also, the face of the meter which is uppermost and level may be covered with silt and thus rendered substantially opaque.

The mode of operation of the meter reading scope is quite simple, as follows. The scope is collapsed, FIG. 4, and its lower end is placed slightly underwater to submerge the aperture 22 and then the scope is extended telescopically to draw water into the scope through the aperture 22. Following this, the lower end of the scope is placed over and close to the face of meter M and the scope is compressed or collapsed to force the water out through the aperture 22 in a rather strong jet stream which positively washes from the face of the meter any silt or sediment which may be obliterating it. With the small light bulb 26 turned on, the submerged meter can be read easily from above ground level without any necessity for bailing out the meter box. The advantages of the present invention over the prior art can now be readily understood by those skilled in the art. The device is not only convenient to use but effects a great savings of time over customary practices and thus saves money in the meter reading operation.

The invention is capable of other uses, for example, it could be used by conservation agents or biologists to observe marine life in turbid water either day or night. It could be useful to chemical companies in checking the bottoms of storage tanks while they remain filled with liquids.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A submerged meter reading device comprising a scope having telescoping tube sections and lenses at the opposite ends of the scope, one lens having an aperture by means of which fluid may be drawn into the scope by suction when the scope is extended and by means of which a pressurized fluid stream can be expelled from the scope to wash a meter face when the scope is compressed, and an illuminating means in the scope near the lens having said aperture.

2. A submerged meter reading device as defined in claim 1, and said illuminating means comprising a light bulb and socket unit secured to the wall of one telescoping tube section, a water tight transulucent enclosure for said light bulb and socket unit, and a battery pack including a light bulb on-off switch attached to the exterior of the scope.

3. A submerged meter reading device as defined in claim 1, and an adjustable compression seal on the scope between said tube sections to regulate the force required to extend and compress the scope.

4. A submerged meter reading device as defined in claim 3, and said seal comprising an elastic gasket surrounding the smaller tube section of the scope and having inclined end faces, one of said end faces engaging an inclined end face on the larger tube section of the scope, a compression collar having screw-threaded engagement with said larger tube section and surrounding the smaller tube section and having an interior inclined surface, the other of said end faces of said elastic gasket engaging the interior inclined surface of said compression collar.

5. A submerged meter reading device as defined in claim 4, and a pair of threaded end caps for the ends of said tube sections adjacent to said lenses and engaging said lenses to secure them to the end faces of said tube sections.

* * * * *